(12) United States Patent
Tateishi et al.

(10) Patent No.: US 6,282,160 B1
(45) Date of Patent: Aug. 28, 2001

(54) DISC PLAYER

(75) Inventors: Kiyoshi Tateishi; Mitsuru Sato, both of Saitama (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/271,316

(22) Filed: Mar. 18, 1999

(30) Foreign Application Priority Data

Mar. 20, 1998 (JP) .................................................. 10-092618

(51) Int. Cl.$^7$ ........................................................ G11B 7/00
(52) U.S. Cl. ............................ 369/47.22; 369/47.27; 369/44.41
(58) Field of Search ............................... 369/275.2, 275.3, 369/44.13, 44.26, 44.28, 44.32, 47

(56) References Cited

U.S. PATENT DOCUMENTS

| | | | |
|---|---|---|---|
| 4,700,337 | 10/1987 | Inagawa et al. ...................... | 369/50 |
| 5,872,767 | * 2/1999 | Nagai et al. ...................... | 369/275.3 |
| 5,930,228 | * 7/1999 | Miyamoto et al. ................ | 369/275.3 |
| 5,933,410 | * 8/1999 | Nakane et al. ..................... | 369/275.3 |
| 6,091,699 | * 7/2000 | Nakane et al. ..................... | 369/275.3 |
| 6,147,961 | * 11/2000 | Nagasawa et al. ................. | 369/275.3 |
| 6,163,522 | * 12/2000 | Nakane et al. ..................... | 369/275.3 |

FOREIGN PATENT DOCUMENTS

| | | |
|---|---|---|
| 0 302 680 A2 | 2/1989 | (EP) . |
| 0 795 858 A2 | 9/1997 | (EP) . |
| 0 871 169 A1 | 10/1998 | (EP) . |
| 0 872 838 A2 | 10/1998 | (EP) . |
| 4-71269 | 11/1992 | (JP) . |

* cited by examiner

Primary Examiner—Nabil Hindi
(74) Attorney, Agent, or Firm—Sughrue, Mion, Zinn, Macpeak & Seas, PLLC

(57) ABSTRACT

Disclosed is a disc player for obtaining a read signal from an optical disc having sectors including land and groove tracks and ID regions, preformatted at given angular spatial intervals, which demarcate the sectors and are segmented, in the track extending direction, into two regions, each segmented region including a plural number of recording regions and non-recording regions, which are alternately and radially arrayed while being radially shifted by approximately half a track pitch from the tracks of the sectors adjacent to the segmented regions, each recording region containing record position information recorded therein having predetermined time durations. The disc player comprises: optical read means for projecting a light beam onto the optical disc and receiving a light beam reflected from a recording surface of the optical disc; first and second signal generating means for generating first and second signals which are dependent on the record position information recorded in the recording regions of the first and second segmented regions by use of a signal output from the optical read means; and ID region detecting means for outputting a detecting signal indicating that the ID region is detected when the first and second signals are both present.

7 Claims, 13 Drawing Sheets

DISC PLAYER

BACKGROUND OF THE INVENTION

The present invention relates to a disc player for reading information from an optical disc having ID regions, segmented into two regions in the direction of the track, in which record position information are preformatted and recorded.

A spindle control system as shown in FIG. 14 is known as the technique for driving an optical disc to rotate in a CAV (constant angular velocity) mode in an optically readable, disc player. Information is read out of a disc 1 being rotated by a spindle motor 2, by a pick-up (not shown). The spindle motor 2 includes means to generate a pulse signal (FG pulse signal) of which the frequency corresponds to a rotation speed of the motor. The FG pulse signal generated is applied to an error generating circuit 3. A reference clock signal of a predetermined frequency corresponding to a target angular speed of the motor is supplied to the error generating circuit 3. The error generating circuit 3 detects frequency and phase errors through the comparison of the clock signal and the FGpulse signal, and applies error signals dependent on the detection errors to a pulse width modulator (PWM) 4. The output signal of the PWM 4 passes through a low-pass filter (LPF) 5 and reaches a drive circuit 6.

Thus, the error signal is PWM processed and only its low frequency component is filtered out. The drive circuit 6 applies a drive signal, which is based on the error signal of the low frequency component, to the spindle motor 2. The spindle motor 2 is controlled so as to reduce the error detected by the error generating circuit 3 to zero (0), viz., so as to maintain the target angular velocity of the motor.

To read the disc 1 in a CLV (constant linear velocity) mode, it is required that the disc 1 is driven to rotate in accordance with a read signal (or a read position) To realize such a drive of the motor, a synchronizing (sync) signal is extracted from the read signal, and the angular velocity of the spindle motor 2 is controlled so that the sync signal has a predetermined frequency.

In connection with the sync-signal basis motor control, the Examined Japanese Patent Application Publication No. Hei 4-71269 discloses the following technique. In a situation where no sync signal is produced, e.g., when the disc player is started or when the pick-up is moved at high speed, the maximum value of the time interval (maximum reversal interval) from the leading edge of a data signal of the read signal to the next trailing edge is detected, and the angular velocity of the spindle motor is controlled so that the maximum reversal interval reaches a predetermined value.

At present, a high density recording disc, called a DVD (digital versatile disc), is increasing its market share. Some type of the DVD has a plural number of formats for recording information therein. A typical example of those DVDs is a DVD-RAM (DVD-random access memory) allowing information to be rewritten into the DVD itself.

The DVD-RAM, or a RAM type DVD, has the following disadvantage when no information is recorded therein or a small amount of information is recorded in a part thereof. In the RAM type DVD, data signals to be used for the control of the spindle motor are absent or, if present, are insufficient for the control. Therefore, the disc player frequently fails to detect the maximum reversal interval or the maximum/minimum time period.

ID regions are preformatted at predetermined angular spatial intervals in the surface of the DVD-RAM. Address information on the disc and information indicative of a groove track or a land track are stored in the ID regions. (The ID region will be described in detail later.) It is required that the disc player accurately detects the ID regions.

SUMMARY OF THE INVENTION

Accordingly, an object of the present invention is to provide a disc player capable of performing a good spindle control of a disc-like recording medium of the DVD-RAM type having no information recorded therein or information recorded in a part thereof in accordance with a signal read out of the disc, and hence of exactly recording information into or playing back the same from the disc.

According to a first aspect of the present invention, there is provided a disc player for obtaining a read signal from an optical disc having sectors including ID regions, preformatted at given angular spatial intervals, which demarcate the sectors and are segmented, in the track extending direction, into two regions, each segmented region including a plural number of recording regions and non-recording regions, which are alternately and radially arrayed while being radially shifted by approximately half a track pitch from the tracks of the sectors adjacent to the segmented regions, each recording region containing record position information recorded therein having predetermined time durations. The disc player comprises: optical read means for projecting a light beam onto the optical disc and receiving a light beam reflected from a recording surface of the optical disc; first and second signal generating means for generating first and second signals which are dependent on the record position information recorded in the recording regions of the first and second segmented regions by use of a signal output from the optical read means; and ID region detecting means for outputting a detecting signal indicating that the ID region is detected when the first and second signals are both present.

According to a second aspect of the present invention, a disc player, based on the first aspect, is constructed such that the ID region detecting means in the disc player produces a detecting signal when the first and second signals continue for a predetermined time.

According to a third aspect of the present invention, a disc player modifies the first aspect or the second aspect such that the first signal generating means generates a first signal by use of a signal formed by binarizing an output signal of the optical read means in accordance with a first threshold value, and the second signal generating means generates a second signal by use of a signal formed by binarizing an output signal of the optical read means in accordance with a second threshold value.

According to a fourth aspect of the present invention, a disc player modifies any of the first to third aspects such that information is recorded in the land tracks and the groove tracks every sector demarcated by the ID regions.

According to a fifth aspect of the present invention, a disc player modifies any of the first to fourth aspects such that the optical disc is controlled in rotation thereof in accordance with the detecting signals.

According to a sixth aspect of the present invention, a disc player, based on the fourth or fifth aspects, further comprises means for judging if the track being currently scanned is a land track or a groove track depending on the first and second signals, and the detecting signals.

The thus constructed disc player is capable of performing a good spindle control of a disc-like recording medium of the DVD-RAM type having no information recorded therein or information recorded in a part thereof in accordance with a signal read out of the disc, and hence of exactly recording information into or playing back the same from the disc.

DETAILED DESCRIPTION OF THE PREFERRED EMBODIMENTS

The preferred embodiments of the present invention will be described with reference to the accompanying drawings.

An example of a recording format of the DVD-RAM will be described.

Figure 1:
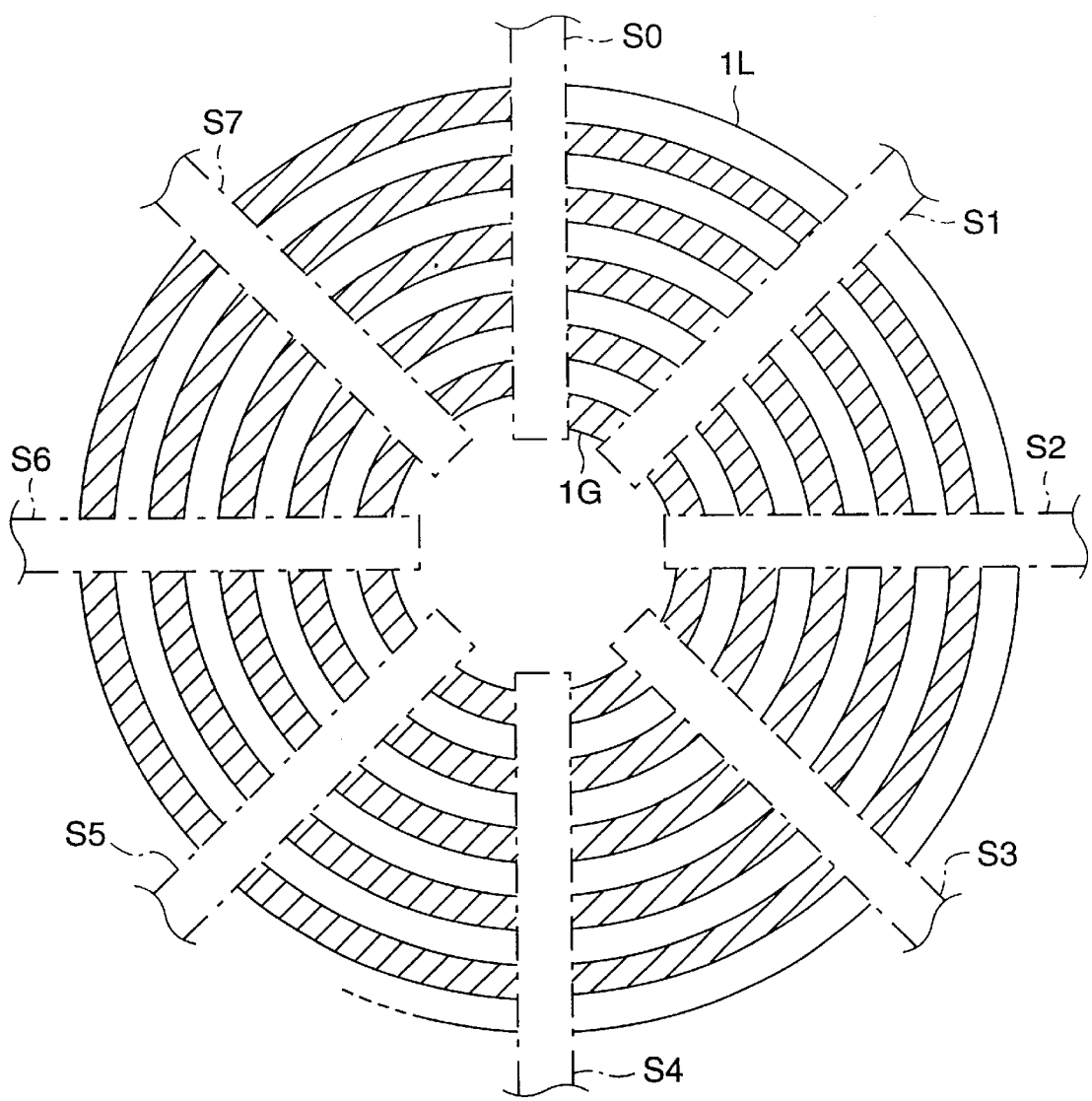
FIG. 1 is a recording format in a recording surface of a DVD-RAM used in a disc player, which is an embodiment of the present invention.

FIG. 1 shows a track structure of the DVD-RAM. The DVD-RAM employs a land/groove (L/G) recording system in which data is stored into groove portions 1G within guide grooves and portions between grooves (land portions) 1L. In FIG. 1, the groove tracks 1G are hatched, while the land tracks 1L are not hatched. The DVD-RAM employs a single spiral land/groove (SS-L/G: single spiral land-groove) recording system in which the land and the groove are interconnected every revolution of the disc to form a single track, spirally configured, in the entire surface of the disc. For the SS-L/G recording system, reference is made to "Access Method for the Single Spiral Land/Groove Recording Method", written by Nakane et al., in "Technical Report of IEICE. MR95-88. CPM95-126 (1996-02)".

The land tracks and the groove tracks are grouped into a plurality of sectors. Those sectors are demarcated by ID regions S0 to S7. The address information (referred to as ID), e.g., physical position and the sector numbers or positions, which substantially define the recording position on the disc, are preformatted and stored in each ID region. Those ID regions are angularly and equidistantly arrayed on the disc, and the recording rates and the reading rates of the ID regions are set to be equal.

Figure 2:
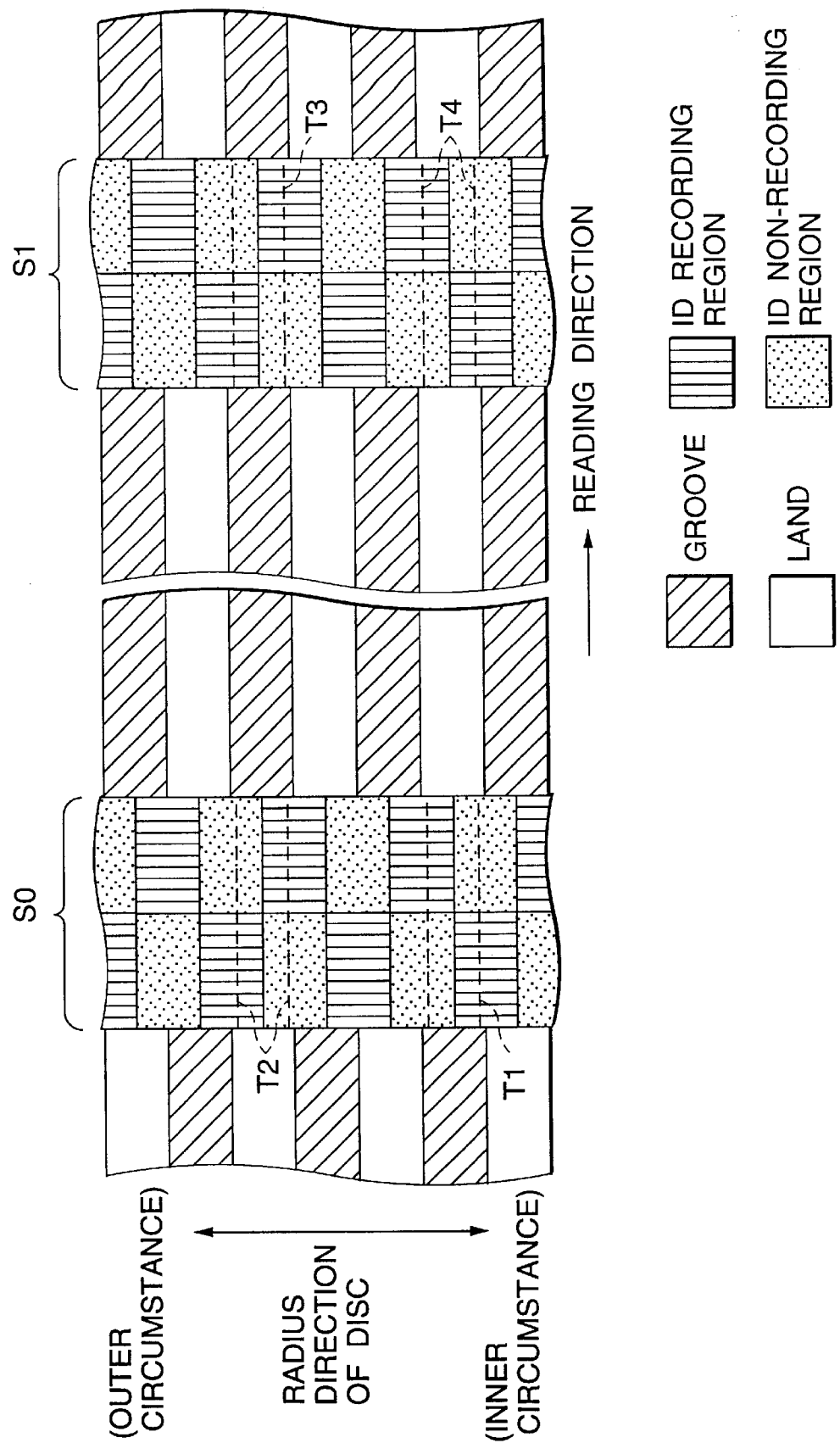
FIG. 2 is a diagram typically showing the detail of ID regions in the recording format shown in FIG. 1.

The detail of the ID regions is illustrated in FIG. 2.

In the figure, an ID region S0 and another ID region S1 are exemplarily illustrated. As shown, in the ID region S0, the groove tracks confront the land tracks. In the ID region S1, the groove tracks confront each other and the land tracks confront each other. As shown, each of the ID regions S0 and S1 includes recording regions and non-recording regions, arrayed radially and alternately. The length of the ID region is the half of the full width of the ID region (when viewed in the read direction, i.e., the direction of track), and the width or height of the ID region is equal to that of the land (groove) track. The recording and non-recording regions, radially arrayed, are radially shifted by approximately half a track pitch from the tracks of the sectors adjacent to the segmented regions.

A sequence of pits representative of an ID pattern are formed in the major surface (each recording region) of the ID region. The non-recording regions are formed of mirror-like surfaces, and on the level of the surfaces of the lands.

In the ID region S0, a virtual track T1 is present interconnecting a groove track (located preceding to the virtual track T1) and a land track (located succeeding thereto). In the virtual track T1, a recording region, which first appears (when viewed in the read direction), is shifted radially inward by half a track pitch with respect to the preceding groove track, and another recording region, which then appears, is shifted radially upward by half a track pitch with respect to the succeeding land track. Also in the ID region S0, a virtual track T2 is present interconnecting a preceding land track and a succeeding groove track. In the virtual track T2, a recording region, which first appears, is shifted radially outward by half a track pitch with respect to the preceding land track, and another recording region, which then appears, is shifted radially inward by half a track pitch with respect to the succeeding groove track.

In the ID region S1, a virtual track T3 is present interconnecting a groove track (located preceding to the virtual track T3) and a groove track (located succeeding thereto). In the virtual track T3, a recording region, which first appears, is shifted radially outward by half a track pitch with respect to the preceding groove track, and another recording region, which then appears, is shifted radially inward by half a track pitch with respect to the succeeding groove track. Also in the ID region S1, a virtual track T4 is present interconnecting a preceding land track and a succeeding land track. In the virtual track T4, a recording region, which first appears, is shifted radially inward by half a track pitch with respect to the preceding land track, and another recording region, which then appears, is shifted radially outward by half a track pitch with respect to the succeeding land track.

Thus, in the ID region S0, the land track is switched to the groove track and the groove track is switched to the land track. An occurrence pattern in the recording region (already stated) is switched to another pattern.

Figure 3:
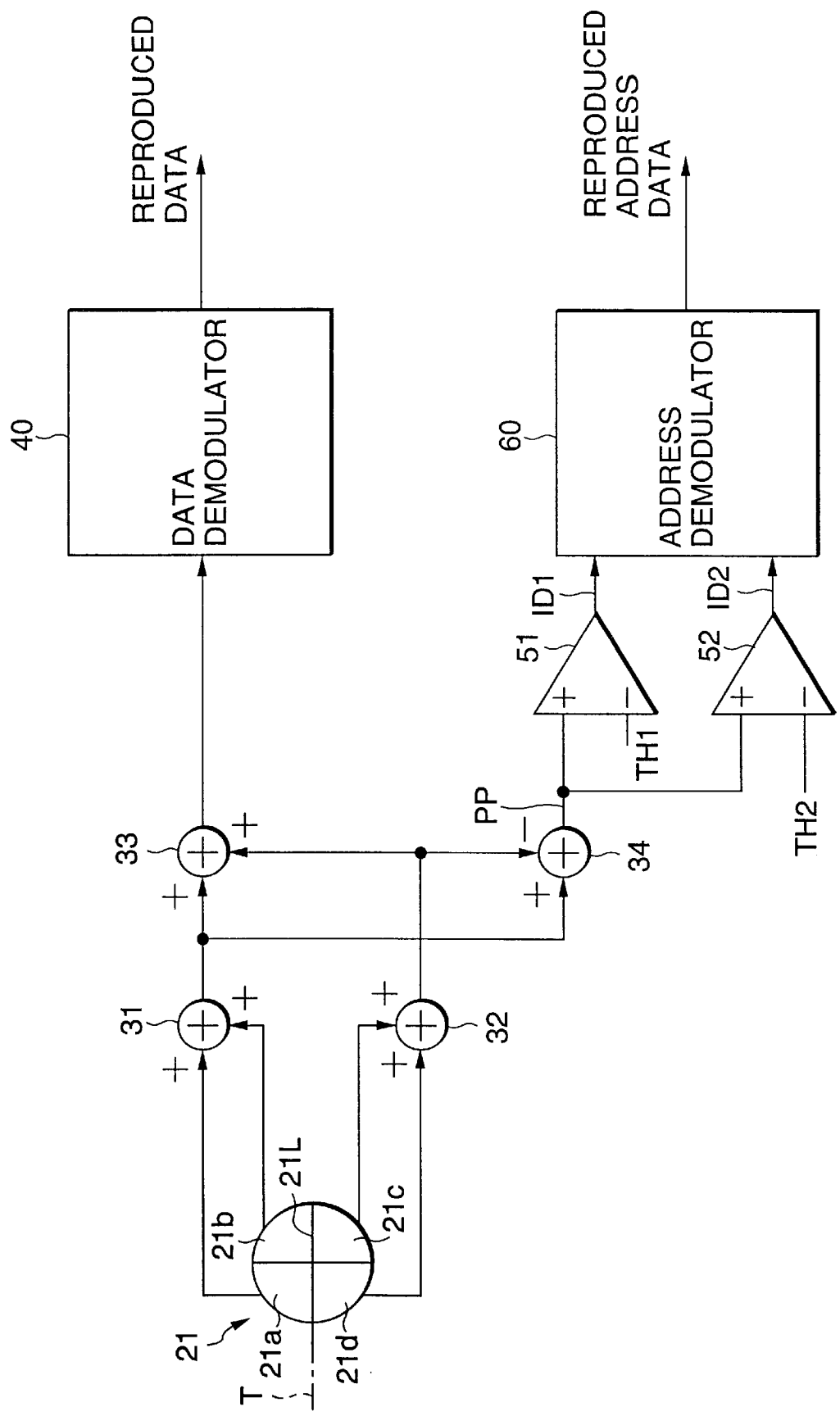
FIG. 3 is a block diagram showing an information reading system for the disc player.

Description will be given about a disc player for recording information into and playing back or reading the same from the thus formatted DVD-RAM. FIG. 3 shows an outline of an information reading system for the disc player. In the figure, a pickup drives a light source (not shown) to emit a light beam toward the disc, and receives a light beam reflected from a recording surface of the disc by a photo-sensor 21. As shown, a surface of the photo-sensor 21 is equally divided into four photo-sensing areas 21a, 21b, 21c and 21d by two dividing lines orthogonally intersecting each other.

Those photo-sensing areas 21a to 2d are separated, with respect to the horizontal dividing line 21L, into two groups; one group consists of photo-sensing areas 21a and 21b, which are symmetrical with respect to the vertical dividing line 2L (?), and the other group consists of the photo-sensing areas 21c and 21d. The photo-sensing areas 21a and 21b of the first group independently perform light-to-electric conversion processes in accordance with the quantities of received light and states of light receiving, and apply the conversion results to an adder 31. Similarly, the photo-sensing areas 21c and 21d of the second group independently perform light-to-electric conversion processes in accordance with the quantities of received light and states of light receiving, and apply the conversion results to an adder 31.

The output signals of those adders 21 and 32 are applied to an adder 33. The adder 33 generates a total sum signal that depends on the quantity of received light and the light receiving state in the entire photo-sensing area, and outputs it as a read signal RF to a data demodulator 40. The data demodulator 40 performs a given demodulation process to generate playback data, and sends the playback data to other systems (not shown), e.g., a data processing system and an information playback system. The demodulation process includes the processing of the read signal for wave shaping and A/D (analog/digital) conversion, the removal of the RLL (run length limited) coding, and others.

The output of the adders 31 and 32 are also applied to a subtractor 34. The subtractor 34 produces a signal, called a push-pull signal PP, which depends on a difference between the output signals from the photo-sensing areas symmetrical with respect to the vertical dividing line 2L. The push-pull signal is input to the noninverting input terminals of differential amplifiers 51 and 52 as comparators.

Signals, which depend on threshold values TH1 and TH2, are input to the inverting input terminals of the differential amplifiers 51 and 52, respectively. The differential amplifier 51 compares the received push-pull signal with the corresponding threshold value TH1, and produces a signal binarized in accordance with the comparison result in the form of a read address signal ID1 to an address demodulator 60 and an ID region detecting system to be given later. Similarly, the differential amplifier 52 compares the received push-pull signal with the corresponding threshold value TH2, and produces a signal binarized in accordance with the comparison result in the form of a read address signal ID1 to the same. The address demodulator 60 executes a given demodulation process of the read signal to generate a playback address data, and transfers the playback address data to an address processing system and a system control system. The ID region detecting system receives the read address signals ID1 and ID2, and executes the following process on the basis of those signals; a process of controlling the rotation of the disc and a process of judging if the current track (being currently scanned) is a land track or a groove track.

Next, description will be given about a spindle control using the ID region detecting system in the disc player.

Figure 4:
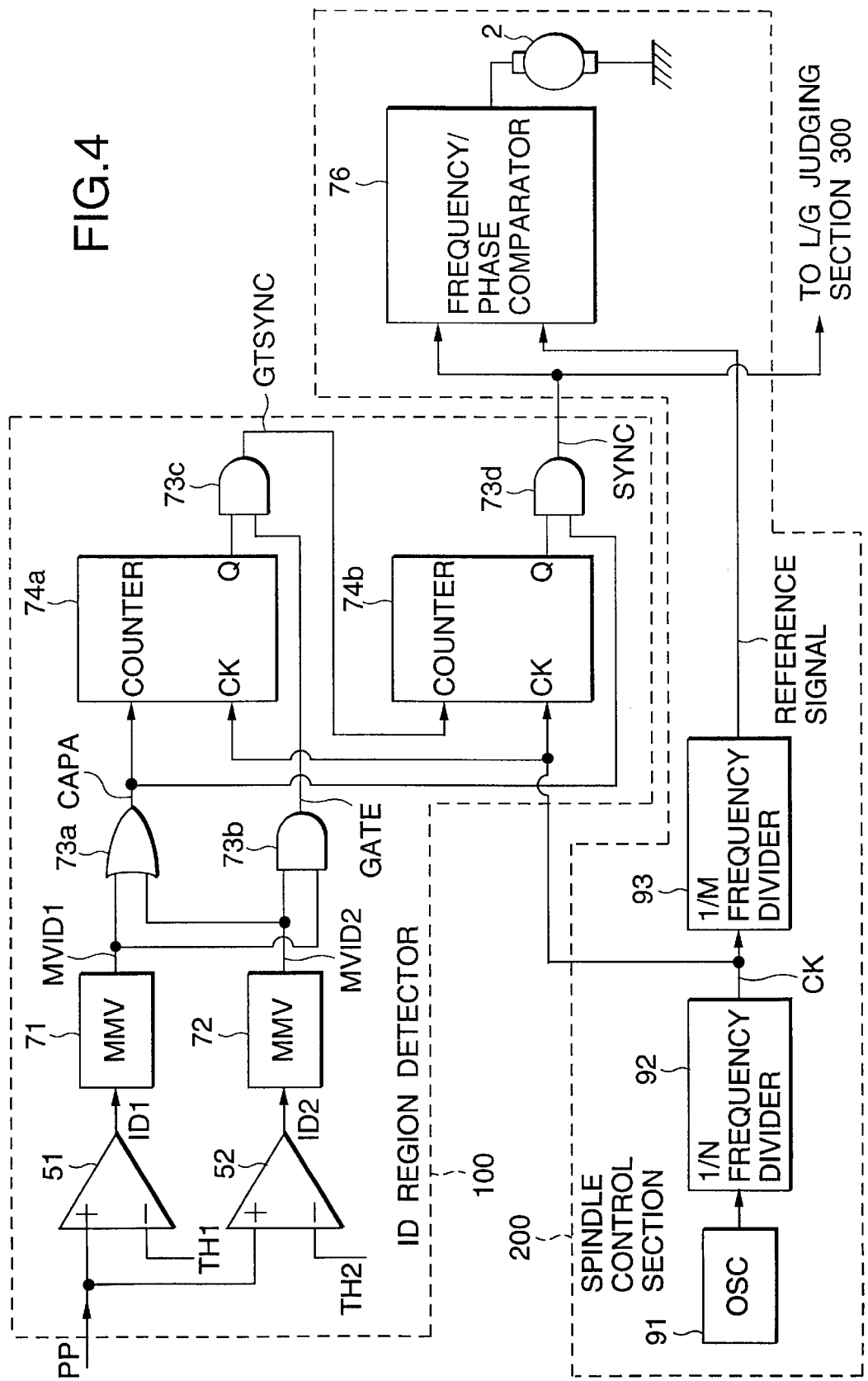
FIG. 4 is a block diagram showing an arrangement of an ID region detecting system in the disc player.

FIG. 4 is a block diagram showing an arrangement of an ID region detecting system of the disc player. The ID region detecting system includes an ID region detector 100 and a spindle control section 200. In accordance with an ID-region detecting signal output from the ID region detector 100, the spindle control section 200 controls the rotation of a spindle motor 2.

In the ID region detector 100, read address signals ID1 and ID2 as the output signals of differential amplifiers 51 and 52 are respectively input as trigger signals to monostable multivibrators (MMVs) 71 and 72. Each of the MMVs 71 and 72 produces a signal (high level signal), which is higher in level than the trigger signal, for a preset time. When another trigger signal comes in during the high level signal, the MMV 71 (72) continues the generation of the high level signal for another preset time. In this way, the MMVs 71 and 72 produce a first signal MVID1 and a second signal MVID2 which in turn are input to an OR gate 73a and an AND gate 73b simultaneously.

The OR gate 73a logically sums the first and second signals MVID1 and MVID2 and produces a signal CAPA for transfer to the inputs of a counter 74a and an AND gate 73d. The AND gate 73d ANDs the first and second signals MVID1 and MVID2 and produces a gate signal GATE for transfer to an AND gate 73c. The counter 74a performs a counting operation of a clock signal CK received from a 1/N frequency divider 92 when the signal CAPA supplied thereto is in a high level, and outputs a pulse signal to the AND gate 73c when its count value reaches a first count value QTH1.

The AND gate 73c logically multiplies the supplied gate signal and the output signal of the counter 74a to generate a gate sync signal (GTSYNC) and transfers it to a counter 74b. In response to the gate sync signal (GTSYNC), the counter 74b starts a counting operation of a clock signal CK received from the 1/N frequency divider 92. When the count value of the counter 74b reaches a second count value QTH2, the counter 74b produces a pulse signal to the AND gate 73d. The AND gate 73d logically multiplies the count outputs from the CAPA and the counter 74b to generate a sync signal (SYNC) indicating the detection of ID region, and supplies to a frequency/phase comparator 76.

On the contrary, the spindle control section 200 has a reference signal generating system including a crystal oscillator (OSC) 91, a 1/N frequency divider 92 and a 1/M frequency divider 93. An output signal of the crystal oscillator 91 is frequency divided into a signal having a 1/N frequency (N: integer of 1 or larger). The frequency divided signal is applied as a clock signal CK to the counters 74a and 74b. The output signal of the 1/N frequency divider 92 is output to the 1/M frequency divider 93 where it is frequency divided into a signal having a 1/M frequency (M : integer of 1 or larger), and applied as a reference signal to a frequency/phase comparator 76 where it is compared in frequency and phase with a synchronizing signal SYNC.

The frequency/phase comparator 76 compares the frequency and phase of the reference signal (the frequency divided signal output from the 1/M frequency divider 93) with those of the synchronizing signal SYNC from the ID region detector 100, and produces signals representative of the frequency and phase errors, and applies a rotation drive signal that depends on the error signals to the spindle motor 2.

Therefore, the number of revolutions of the spindle motor 2 can be controlled so that a synchronizing signal SYNC that is generated every time the ID region is read out appears at fixed time intervals.

Figure 5:
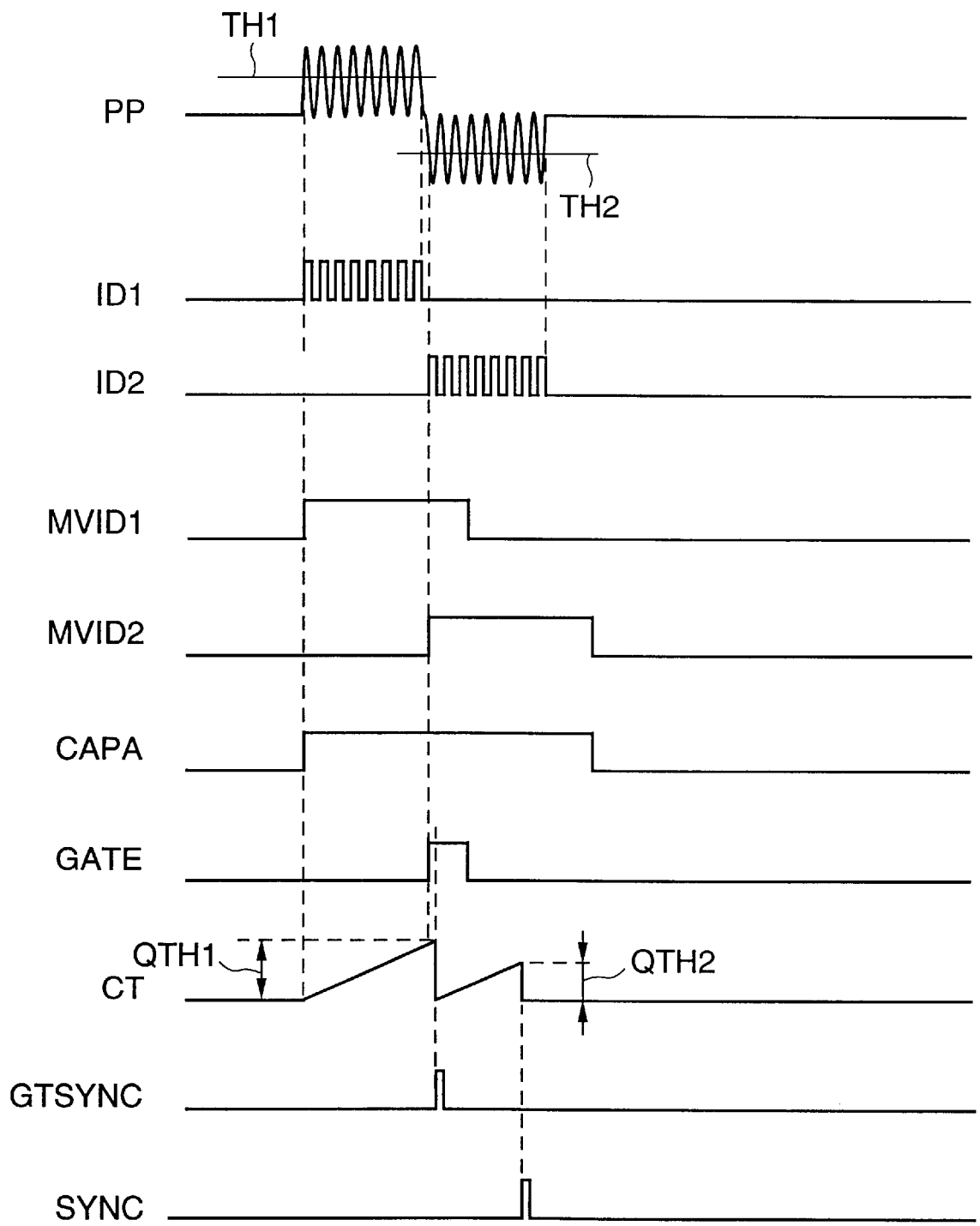
FIG. 5 is a timing chart showing an operation of the ID region detecting system.

FIG. 5 shows waveforms of the signals at the key points in the ID region detecting system of FIG. 4 when a light beam scans a track including a virtual track T1 (FIG. 2) of the ID region S0, which interconnects a groove track preceding to the virtual track and a land track succeeding to the same. A push-pull signal PP represents an inward or outward shift of the land/groove from the center of the track at a read point (position of a beam spot on the recording disc). In this respect, the push-pull signal PP is equivalent to a called tracking error signal.

When the read point scans the virtual track T1 (FIG. 2), the push-pull signal PP takes a waveform having the upper and lower peaks corresponding to a series of pits arrayed on the virtual track T1 of the ID region S0. The push-pull signal PP shown in FIG. 5 is produced by scanning the virtual track T1 of the ID region S0, segmented half as already mentioned, with the read point in such a manner that the first recording region (the lower left half of the virtual track T1) and the first non-recording region (the upper left half of the virtual track T1) are first read, and then the second recording region (the upper right half of the virtual track T1) and the second non-recording region (the lower right half of the virtual track T1) are read.

A threshold value TH1 that is applied to the noninverting input terminal of the differential amplifier 51 (FIG. 4) is much higher than the reference level of the push-pull signal PP. When receiving a push-pull signal PP having positive peak values higher than the threshold value THi1, the differential amplifier 51 produces a high level signal ID1. A threshold value TH2 that is applied to the noninverting input terminal of the differential amplifier 52 is much lower than the reference level of the push-pull signal PP. When receiving a push-pull signal PP having negative peak values much lower than the threshold value TH2, the differential amplifier 52 produces a low level signal ID2.

Thus, the push-pull signal PP consisting of successions of small sinusoidal waveforms, which are read out from the preceding and succeeding recording regions of the ID region, are converted into read address signals ID1 and ID2 (FIG. 5) consisting of successions of small rectangular waveforms by the differential amplifiers 51 and 52. The MMVs 71 and 72 are triggered at the leading or trailing edges of the rectangular waves of the read address signals ID1 and ID2.

The MMV 71 produces a high level signal MVID1 which keeps a high level over a period of time ranging from the leading edge of the first rectangular wave of the read address signal ID1 to a time point after a preset time elapses from the leading edge of the last rectangular wave. The MMV 72 produces a high level signal MVID2 which keeps a high level over a period of time ranging from the trailing edge of the first rectangular wave of the read address signal ID2 to another time point after a preset time elapses from the trailing edge of the last rectangular wave.

The first and second signals MVID1 and MVID2 are applied to the OR gate 73a which in turn produces a signal CAPA. The signal CAPA is high in level over a period of time ranging from the leading edge of the first rectangular wave of the read address signal ID1 to a time point after a preset time elapses from the trailing edge of the rectangular wave of the read address signal ID2. The signal CAPA output from the OR gate 73a is applied to the counter 74a and the AND gate 73d.

The counter 74a is arranged so as to be reset to 0 (zero) when the signal CAPA is at 0 level. Then, when the first or second signal MVID1 or MVID2 goes high (in level), the counter 74a is ready for its counting operation. Accordingly, when the first or second signal MVID1 or MVID2 is in high level, he counter 74a counts a clock signal (consisting of clock pulses) at a relatively high frequency CK received from the 1/N frequency divider 92.

In this case, the counter 74a increases its count value Q and supplies it to the input terminal of the AND gate 73c till the count value Q reaches a first count value QTH1 (corresponds to a time longer than a time taken for reading the preceding ID recording region in the ID region S0 at a given linear speed). When the count value Q reaches the first count value QTH1, the counter 74a resets its count value to 0 (zero), and a gate sync signal GTSYNC is generated and transferred to the counter 74b.

The first and second signals MVID1 and MVID2 are logically processed into a gate signal GATE. The gate signal GATE goes high in a time period where the first and second signals MVID1 and MVID2 are both logically high, and is transferred to the AND gate 73c. The fact that the gate signal GATE of high level is generated indicates that the read point has read the preceding recording and non-recording regions in accordance with a reading direction (FIG. 2) in the ID region S0, and the succeeding recording and the non-recording regions.

When receiving a count value signal from the counter 74a and a high level gate signal GATE from the AND gate 73b, the AND gate 73c generates a gate sync signal (GTSYNC) as a high level pulse signal, and transfers it to the counter 74b. The gate sync signal GTSYNC is generated at a time point where the counter 74a is reset to have its count value of 0 (zero).

In response to a high level gate sync signal GTSYNC, the counter 74b counts a clock signal (consisting of clock pulses) CK of a relatively high frequency. In this case, the counter 74b increases its count value Q and continues the supply of the count value Q to the input terminal of the AND gate 73d till the count value Q reaches a second count value QTH2. When the count value Q reaches the second count value QTH2, the resets its count value Q to 0 (zero).

When a high level signal CAPA from the OR gate 73a is applied to the AND gate 73d and the counter 74b is reset to have the count value Q of 0 (zero) the AND gate 73d produces a synchronizing signal SYNC as a high level pulse signal to the frequency/phase comparator 76 and an L/G judging section 300 to be given later. The synchronizing signal SYNC is generated when the contents of the counter 74b is reset to zero.

In this way, the ID region detecting system generates a synchronizing signal SYNC positionally synchronized with the ID region S0.

Figure 6:
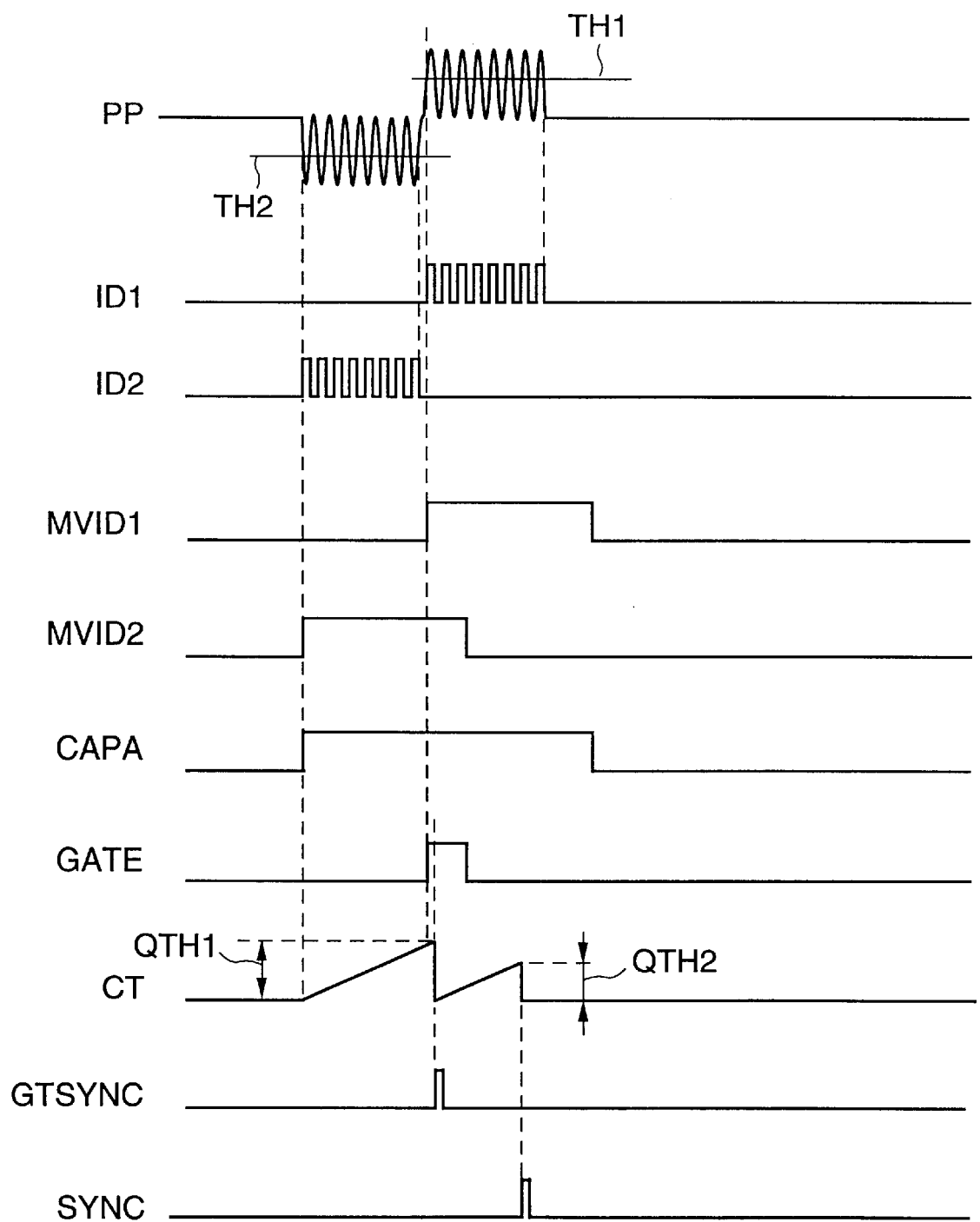
FIG. 6 is a timing chart showing another operation of the ID region detecting system.

FIG. 6 shows waveforms of the signals at the key points in the ID region detecting system of FIG. 4 when a light beam scans a track including a virtual track T2 (FIG. 2) of the ID region S0, which interconnects a land track preceding to the virtual track and a groove track succeeding to the same. As seen from the figure, the spindle control system operates as shown in FIG. 5 and produces a synchronizing signal SYNC corresponding in position to the ID region S0.

In the remaining ID regions S1 to S7, the ID region detecting system generates synchronizing signals SYNC which are positionally synchronized with those ID regions, in similar manners.

As described above, the ID region detecting system produces a gate signal GATE by the AND gate 73b to show that the preceding and succeeding recording regions, which are radially arrayed shifted by approximately half a track pitch from the related tracks, are present. The ID region detecting system produces a gate sync signal GTSYNC by the AND gate 73c to show that the recording portion is switched from the preceding recording region to the succeeding recording region. Further, the ID region detecting system generates a synchronizing signal SYNC every ID region, and controls a rotation angle of the optical disc that is rotating together with the spindle motor 2.

Figure 7:
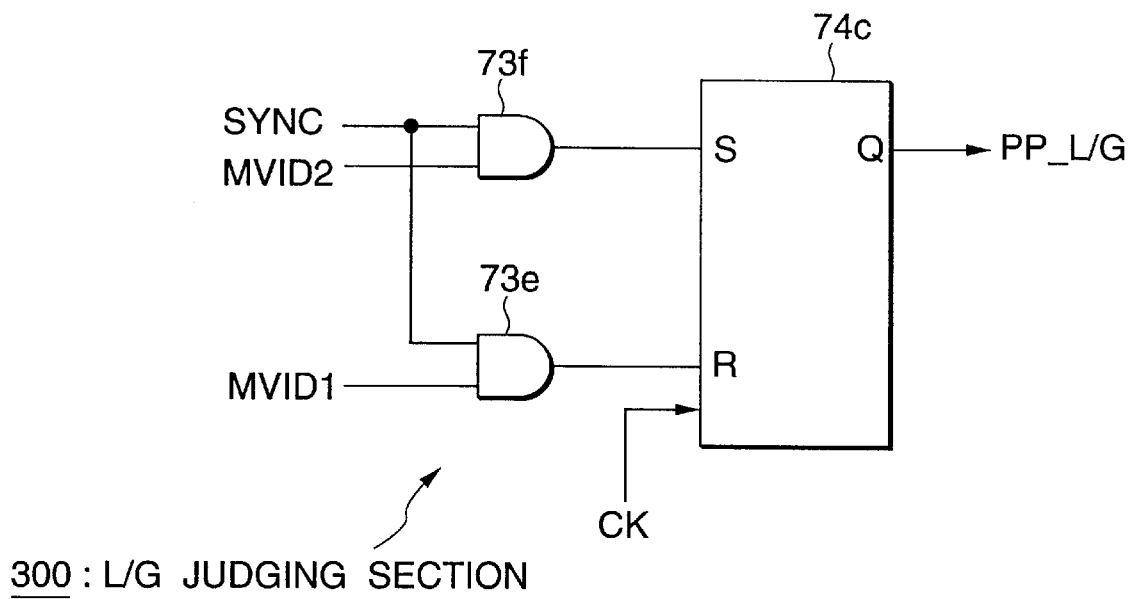
FIG. 7 is a block diagram showing an L/G judging section contained in the ID region detecting system of FIG. 4.

The ID region detecting system includes an L/G judging section 300 as shown in FIG. 7. The L/G judging section 300 judges whether or not the track preceding or succeeding to each ID region is a land track or a groove track.

In the L/G judging section 300, an AND gate 73e ANDs a synchronizing signal SYNC and a first signal MVID1 to generate a reset signal R; an AND gate 73f ANDs a synchronizing signal SYNC and a second signal MVID2 to generate a set signal S; and a flip-flop circuit (FF) 74c receives those signals R and S and produces a PP-L/G signal. The PP-L/G signal of high level indicates that the track is a land track, while the PP-L/G signal of low level indicates that the track is a groove track. Thus, the ID region detecting system recognizes if the succeeding track is a land track or a groove track on the basis of the level of the PP-L/G signal. The flip-flop circuit 74c operates while being timed by a clock signal CK received from the 1/N frequency divider 92.

Figure 8:
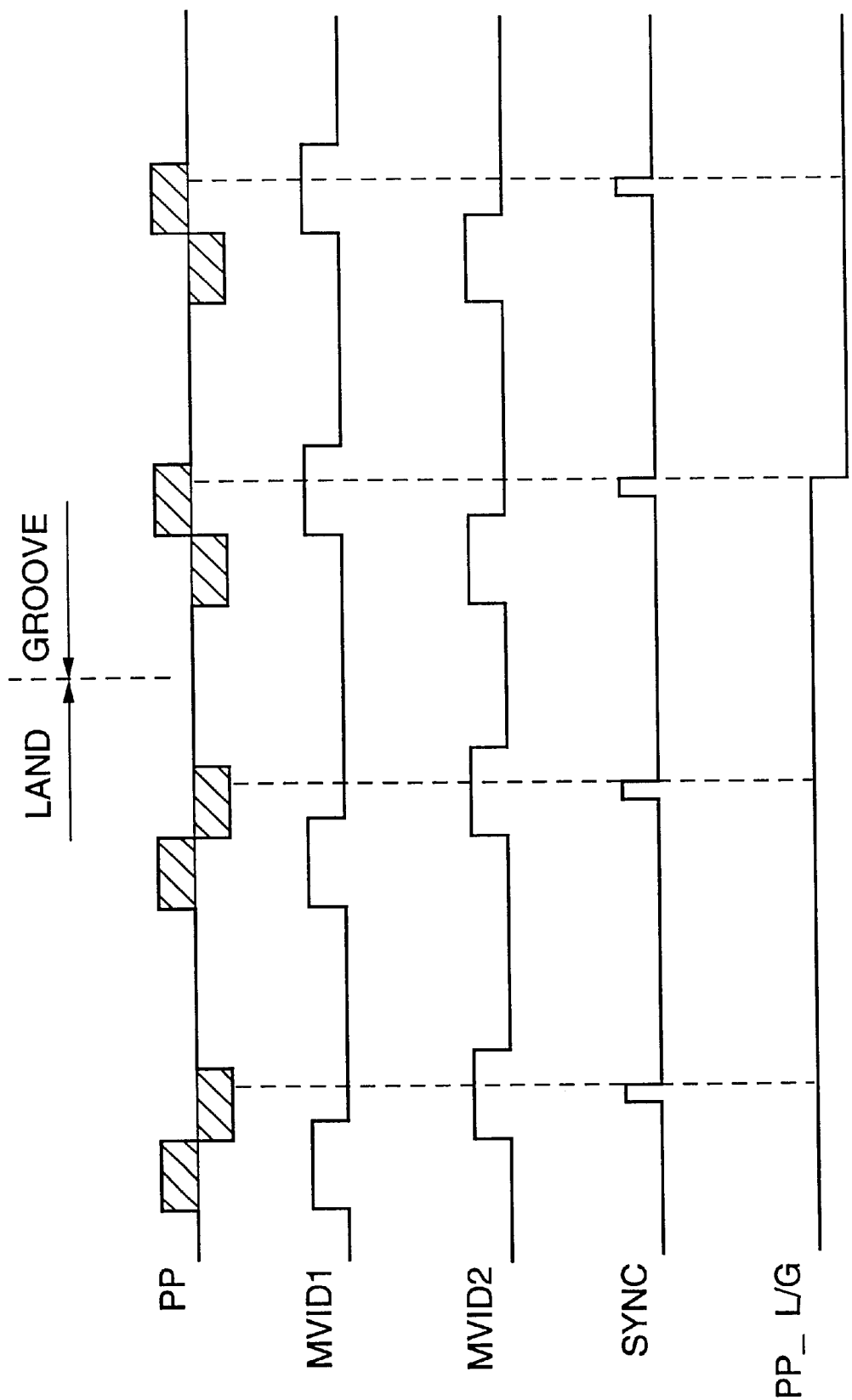
FIG. 8 is a timing chart showing in particular a variation of a PP-L/G signal output from a flip-flop circuit.

FIG. 8 is a timing chart showing in particular a variation of a PP-L/G signal output from the flip-flop circuit 74c shown in FIG. 7. As seen, before and after an ID region of which the virtual track follows the land track and is followed by the same kind of track, i.e., land track, the PP-L/G signal maintains a high level. At the ID region S0 where the track being currently scanned, i.e., the current track, is switched from the land track to the groove track, the level of the PP-L/G signal is switched from high level to low level. Before and after an ID region of which the virtual track follows the groove track and is followed by the same kind of track, i.e., groove track, the PP-L/G signal maintains a high level.

The current track (corresponding to the virtual track T2) which follows the land track and is followed by the groove track is illustrated in FIG. 8. In the case of the current track (corresponding to the virtual track T1 of FIG. 2) which follows the groove track and is followed by the land track, the PP-L/G signal is switched from low level to high level, as a matter of course.

Thus, the ID region detecting system recognizes if the current track is a land track or a groove track without decoding the information recorded in the ID region, by the utilization of the SYNC-basis rotation angle control and the groove/land judgement by the L/G judging section 300 (the judgement is made on the current track, or the track being currently scanned).

Therefore, the disc player drives the spindle motor at the number of revolutions suitable for the playing back or recording information from and to the disc. The disc player performs the playback and recording operations in the condition most suitable for the current track since it makes the land/groove(L/G) judgement.

The ID recording region stores the information indicative of the kind of track (i.e., a land track or a groove track). Therefore, the ID region detecting system can recognize a kind of the current track by decoding the push-pull signal PP and extracting the track kind information from the signal PP.

In this case, if the information stored in the ID region is defective or cannot be read out because of disturbance, the extraction of the track kind information is impossible.

A selector to be given hereunder may be used for selecting the L/G judgement by the L/G judging section 300 or the L/G judgement based on the track kind information (DEC-L/G) that is produced through the decoding of the push-pull signal PP, in accordance with a playback condition.

Figure 9:
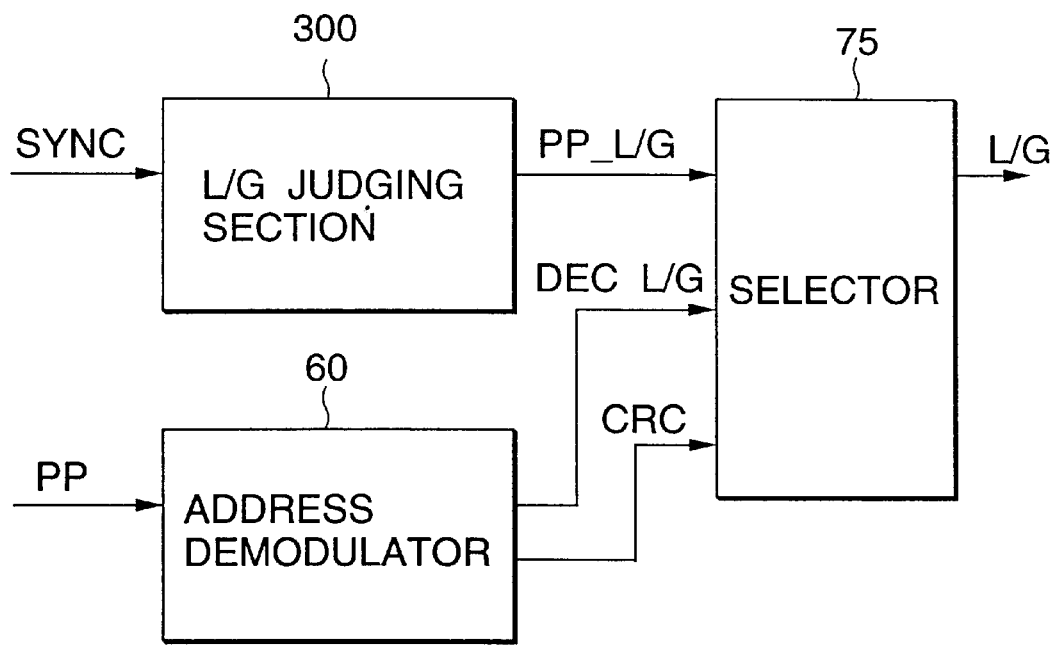
FIG. 9 is a block diagram showing a selector for selecting a PP-L/G signal or a DEC-L/G signal in accordance with a CRC basis error signal.

FIG. 9 is a block diagram showing a selector for selecting a PP-L/G signal or a DEC-L/G signal by use of an error detecting signal produced through a CRC (Cyclic Redundancy Check) contained in the address demodulator 60 of FIG. 3.

A selector 75 shown in FIG. 9 selects a PP-L/G signal derived from the L/G judging section 300 or a DEC-L/G signal derived from the FIG. 3 address demodulator 60. A CRC-basis error detecting signal (referred to as a CRC signal) is also applied to the selector 75, from the address demodulator 60. When the CRC signal is received, viz., an error is detected through the CRC, the selector 75 selects the PP-L/G signal from the L/G judging section 300. When it is not received, the selector 75 selects a DEC-L/G signal read out of the ID region with the aid of the address demodulator 60.

When the information of the ID region is defective, the PP-L/G signal is used for the L/G judgement. Therefore, an accuracy of the L/G judgement is improved.

Figure 10:
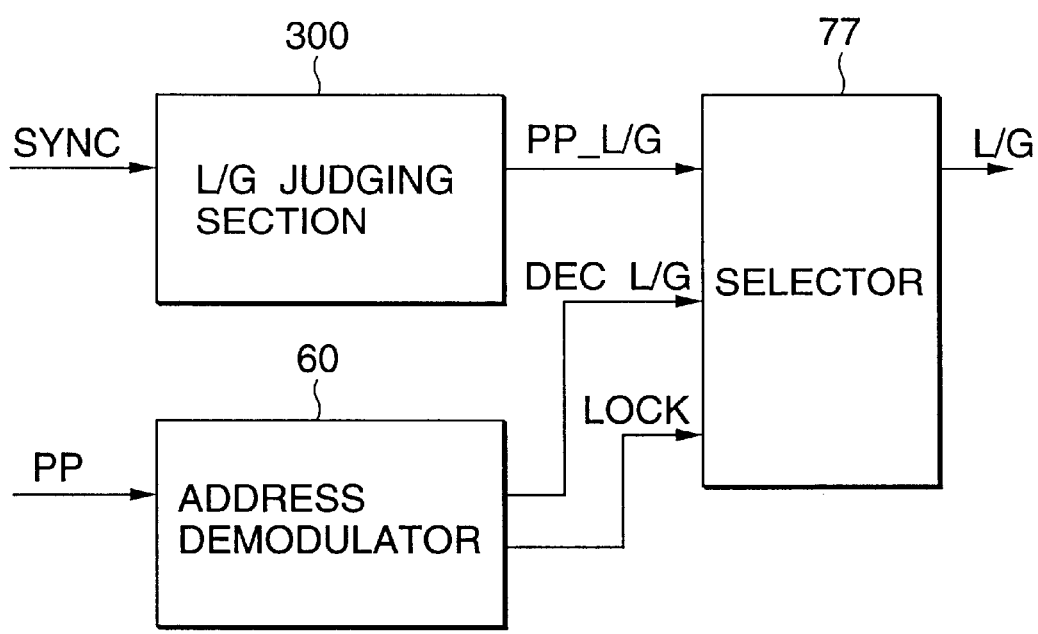
FIG. 10 is a block diagram showing a selector for selecting a PP-L/G signal or a DEC-L/G signal in accordance with a LOCK signal.

FIG. 10 is a block diagram showing as elector for selecting a PP-L/G signal or a DEC-L/G signal in accordance with a LOCK signal that is output from a PLL for demodulating the information of the ID region, which is contained in the FIG. 3 address demodulator 60.

A selector 77 shown in FIG. 10 selects a PP-L/G signal derived from the L/G judging section 300 or a DEC-L/G signal derived from the FIG. 3 address demodulator 60. A lock signal LOCK is also applied to the selector 77, from the PLL of the address demodulator 60.

When the PLL is locked, the selector 77 recognizes that the information of the ID region has been demodulated and selects a DEC-L/G signal. When it is not locked, the selector 77 recognizes that the information of the ID region is not demodulated and selects a PP-L/G signal.

When the ID region information is not demodulated, the PP-L/G signal is used for the L/G judgement. Therefore, an accuracy of the L/G judgement is improved.

Figure 11:
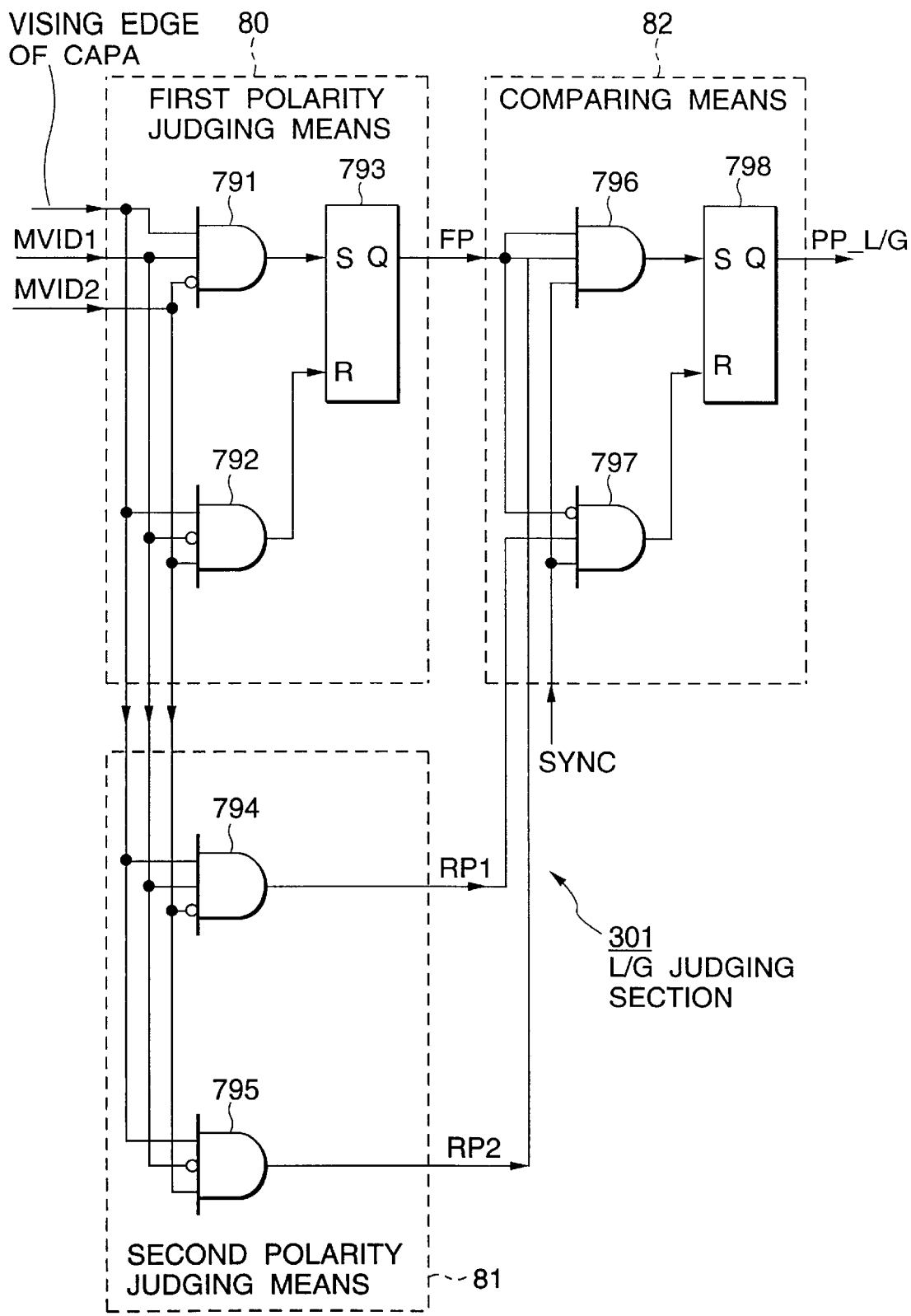
FIG. 11 is a block diagram showing another L/G judging section contained in the ID region detecting system of FIG. 4.

FIG. 11 is a block diagram showing another example of the L/G judging section 300 which makes the L/G judgement by use of the push-pull signal PP (FIG. 7).

In FIG. 11, an L/G judging section 301 is made up of a first polarity judging means 80, a second polarity judging means 81 and a comparing means 82. The first polarity judging means 80 includes AND gates 791 and 792, and a flip-flop 793. The AND gate 791 receives a leading edge of a signal CAPA, a first signal MVID1 and an inverted second signal MVID2; ANDs the first signal MVID1 and the inverted second signal MVID2 at the leading edge of the signal CAPA to generate a set signal S; and transfers it to the S input terminal of the flip-flop 793.

The AND gate 792 receives a leading edge of a signal CAPA, an inverted first signal MVID1 and a second signal MVID2; ANDs the inverted first signal MVID1 and the second signal MVID2 at the leading edge of the signal CAPA to generate a reset signal R; and transfers it to the R input terminal of the flip-flop 793. The flip-flop 793 performs a flip-flop operation in accordance with the set signal S and the reset signal R from those AND gates 791 and 792 to generate a binarized signal FP, and transfers it to the comparing means 82.

The polarity of the signal FP produced by the first polarity judging means 80 thus arranged remains unchanged in the ID region (any of S1 to S7, FIG. 1) where its virtual track interconnects the groove tracks or the land tracks. The polarity of the signal FP is inverted in the ID region (S0, FIG. 1) where its virtual track interconnects the groove track and the land track.

The second comparing means includes AND gates 794 and 795. The AND gate 794 receives a first signal MVID1 and an inverted second signal MVID2; ANDs those signals at the leading edge of a signal CAPA to generate a signal RP1; and transfers it to the comparing means 82. The AND gate 795 receives an inverted first signal MVID1 and a second signal MVID2; ANDs those signals at the leading edge of a signal CAPA to generate a signal RP2; and transfers it to the comparing means 82.

The comparing means 82 is made up of AND gates 796 and 797, and a flip-flop 798. As shown, the AND gate 796 receives a synchronizing signal SYNC, a signal FP from the first polarity judging means 80, and a signal RP2 from the second polarity judging means 81; logically multiplies the signal FP and the signal RP2 at the timing of the synchronizing signal SYNC to generate a binarized signal S; and transfers it to the terminal S of the flip-flop 798.

The AND gate 797 receives a synchronizing signal SYNC, an inverted signal FP from the first polarity judging means 80, and a signal RP1 from the second polarity judging means 81; logically multiplies those signals at the timing of the synchronizing signal SYNC to generate a binarized signal R; and transfers it to the terminal R of the flip-flop 798. The flip-flop 798 performs a flip-flop operation in accordance with the set signal S and the reset signal R from those AND gates to generate a PP-L/G signal.

Figure 12:
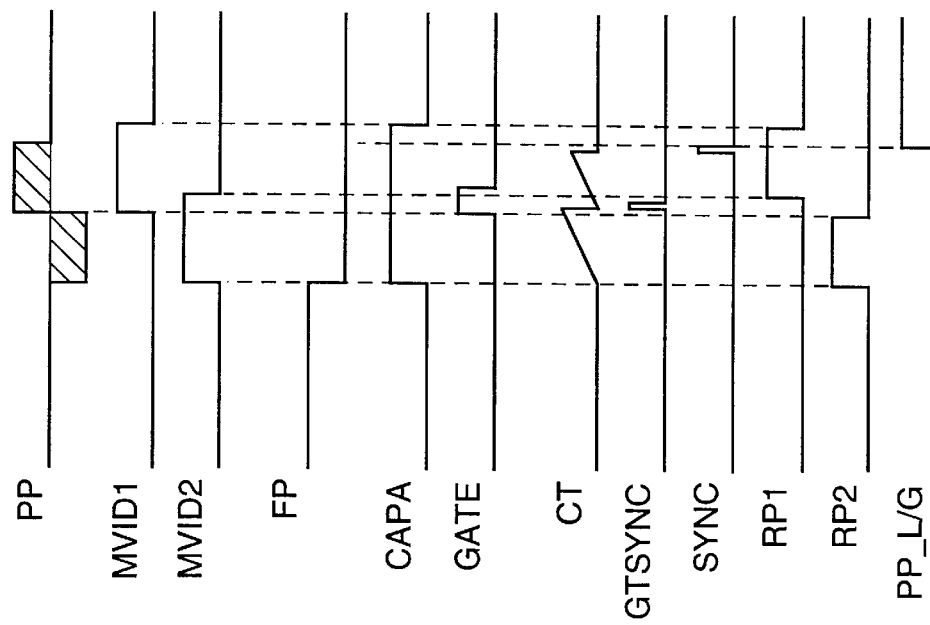
FIG. 12 is a timing chart showing the waveforms of signals FP, RP1, RP2, and a PP-L/G signal in the L/G judging section of FIG. 11, together with the signal waveforms shown in FIG. 5.
Figure 13:
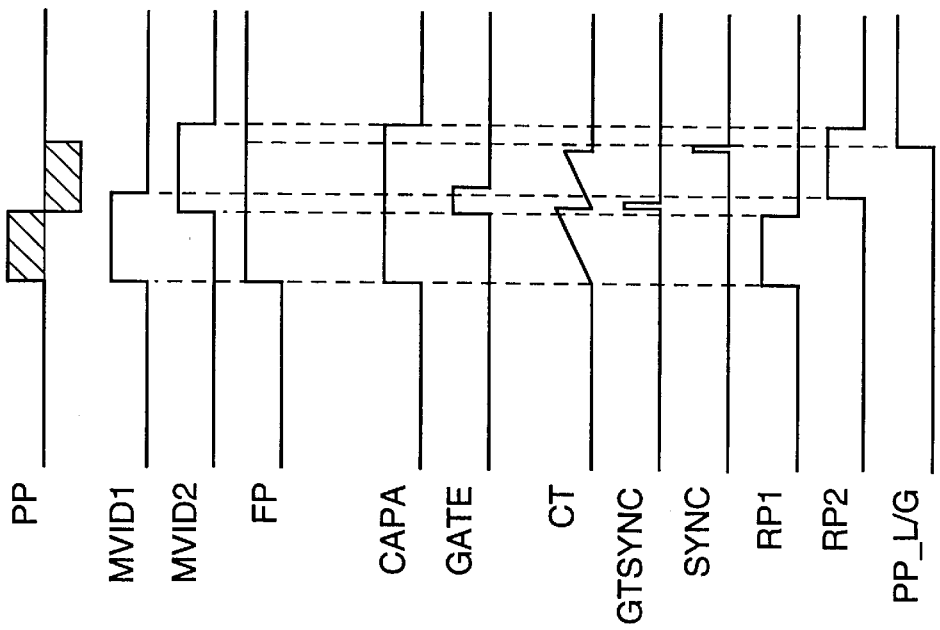
FIG. 13 is a timing chart showing the waveforms of signals FP, RP1, RP2, and a PP-L/G signal in the L/G judging section of FIG. 11, together with the signal waveforms shown in FIG. 6.
Figure 14:
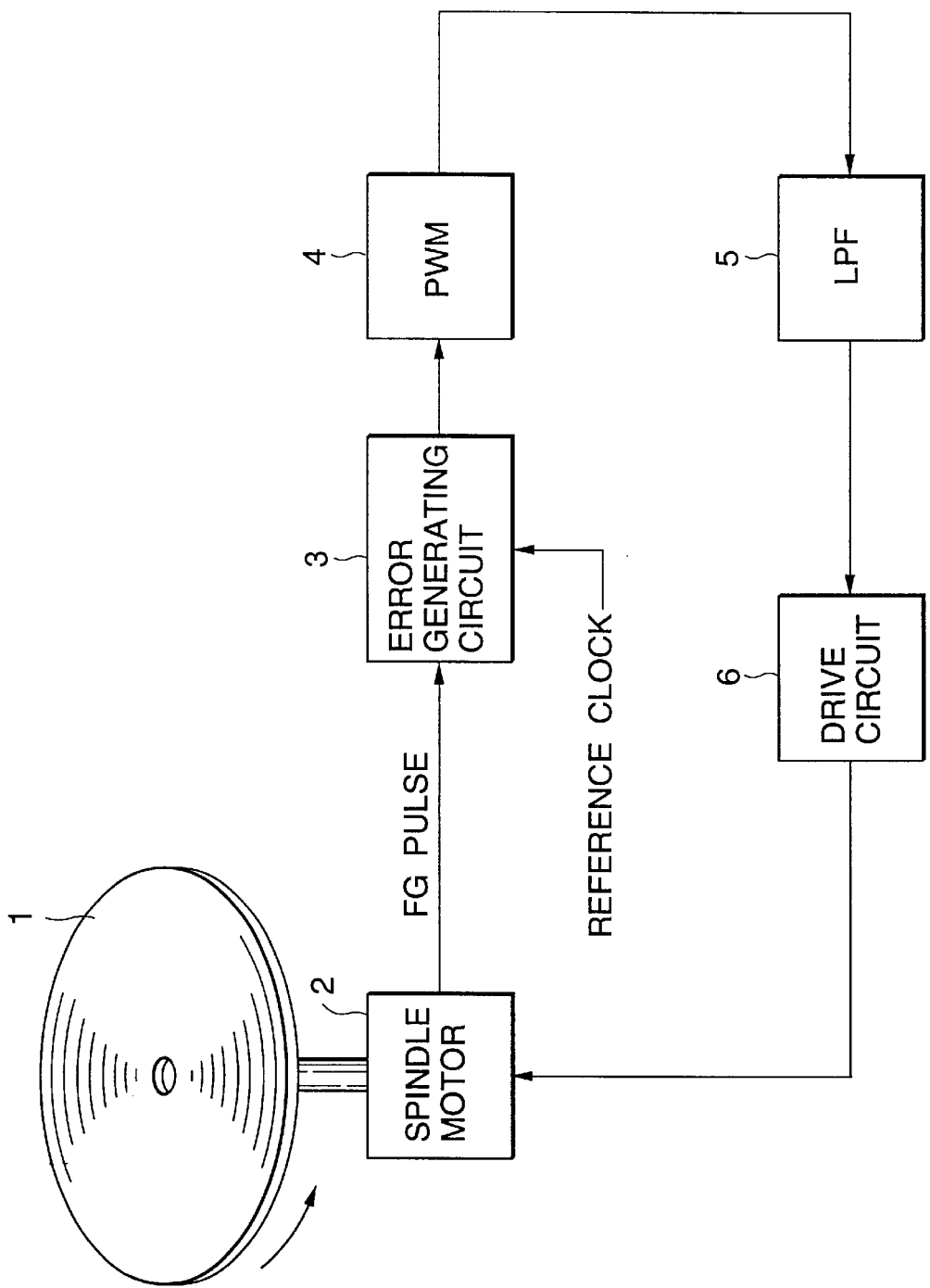
FIG. 14 is a block diagram showing a basic arrangement of a conventional spindle control system for driving an optical disc by the CAV control.
Figure 11:
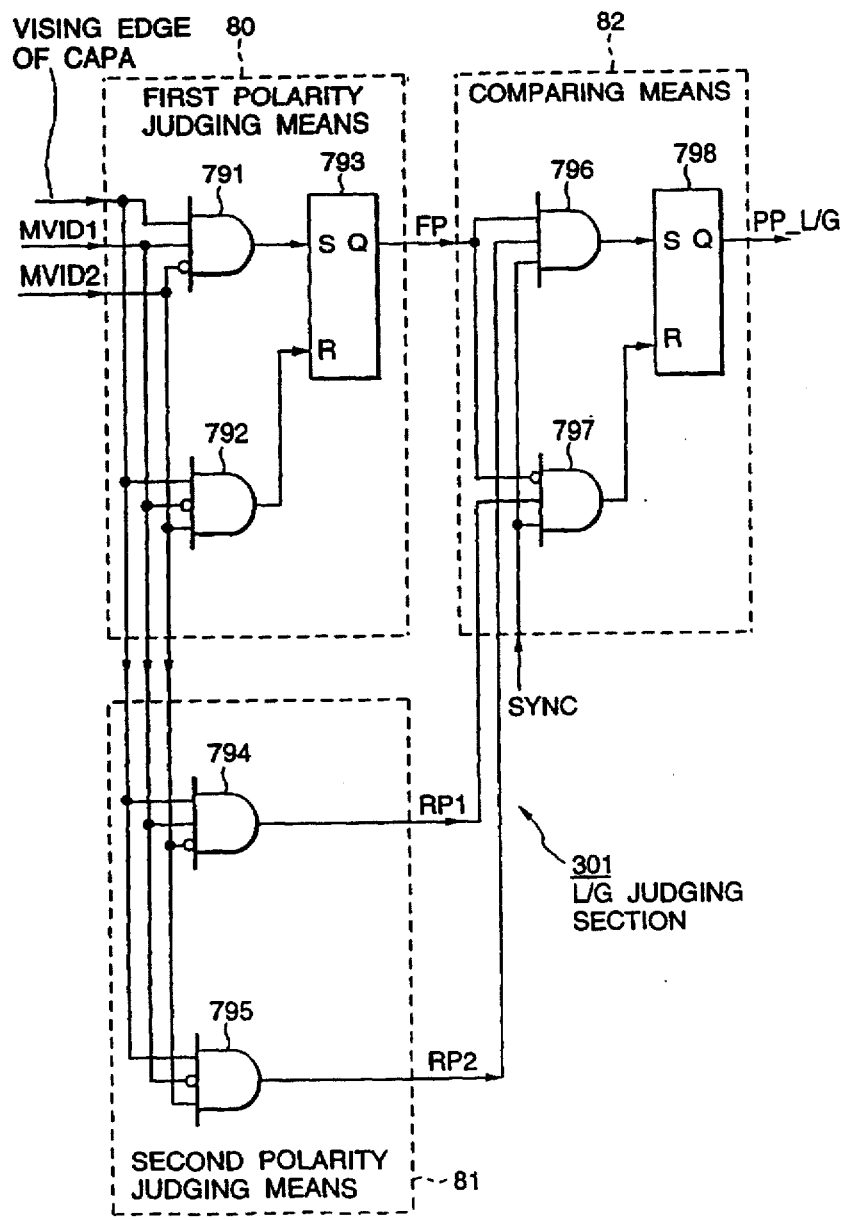
Figure 13:
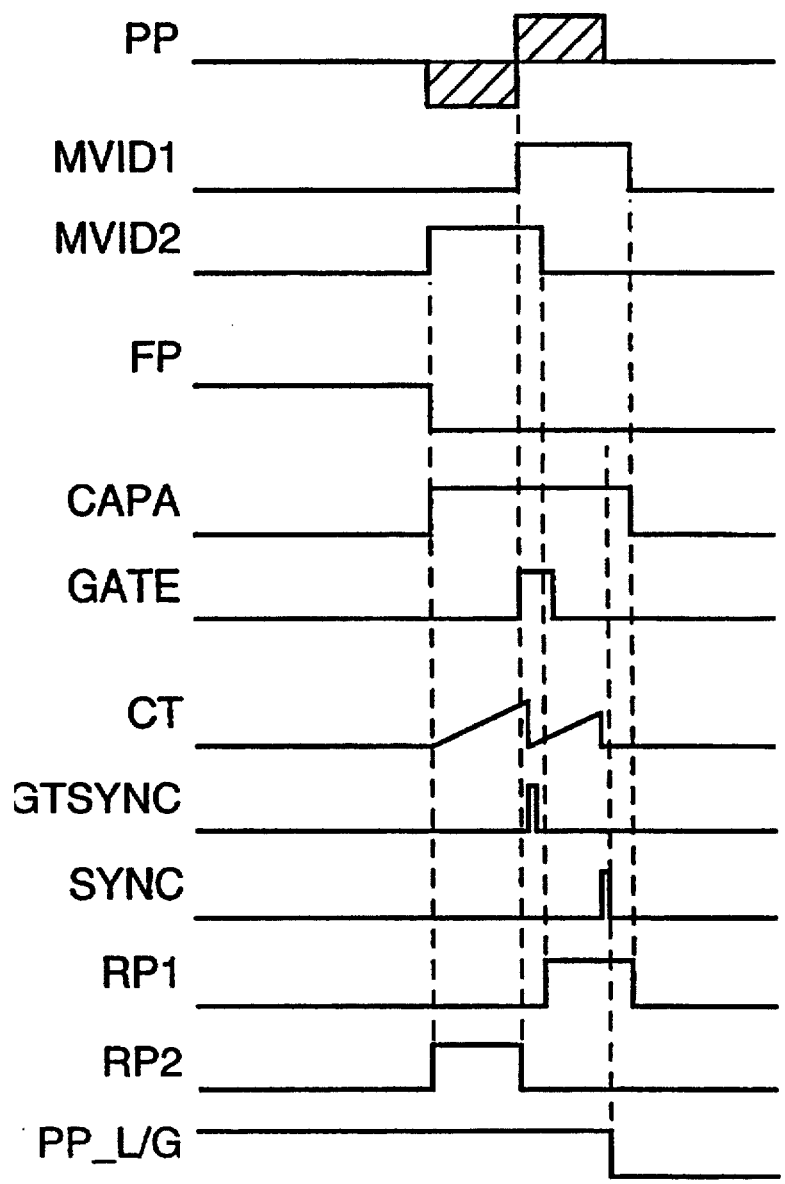

FIG. 12 is a timing chart showing the waveforms of signals FP, RP1, RP2, and a PP-L/G signal in the L/G judging section of FIG. 11, together with the signal waveforms shown in FIG. 5. FIG. 13 is a timing chart showing the waveforms of signals FP, RP1, RP2, and a PP-L/G signal in the L/G judging section of FIG. 11, together with the signal waveforms shown in FIG. 6.

The waveforms of the signals shown in FIG. 12 appear at the related points in the ID region detecting system including the L/G judging section 301 (FIG. 11) when the light beam scans the virtual track T1 of the ID region S0 which follows the groove track and is followed by the land track. At this ID region, the track is switched from the groove track to the land track. Therefore, the signal FP switches its level from low level to high level.

The signal FP exhibits a high level when the first half in the ID region is shifted radially outward, and a low level when it is shifted radially inward. The fact that the signal FP is in high level indicates that the first half of the ID region is shifted radially outward, and hence it is readily conjectured that the second half of the ID region will be shifted radially inward. Therefore, it is readily preestimated that this ID region is for the land track.

Where the signal FP is in low level, the first half of the ID region is shifted radially inward. On this fact, it is conjectured that the second half of the ID region is shifted outward, and hence that this ID region is for the land track. In this sense, the first polarity judging means 80 is means for determine if the first half of the ID region is shifted radially inward.

The second polarity judging means 81 produces the signals RP1 and RP2 indicative of the inward or outward shift of the second half of the ID region. Specifically, a high level of the signal RP1 indicates that the second half of the ID region is shifted radially outward. A high level of the signal RP2 indicates that the second half of the ID region is shifted radially inward. Therefore, in the ID region of the land track, the signal RP1 goes high and then the signal RP2 goes high as shown in FIG. 12.

The comparing means 82 judges if the track being currently scanned is a land track or a groove track on the basis of the synchronizing signal SYNC from the ID region detector 100 (FIG. 4), the signal FP from the first polarity judging means 80, and the signals RP1 and RP2 output from the second polarity judging means 81. When a synchronizing signal SYNC is generated at the ID region S0 where the groove track is switched to the land track, the signal FP is in high level, the signal RP1 is in low level, and the signal RP2 is in high level. Therefore, the output signal of the AND gate 796 is in high level. And the output signal of the AND gate 797 is in low level.

Under this condition, the set signal S to the flip-flop 798 goes high and the reset signal R to the same goes low, so that the output signal Q of the flip-flop 798 is inverted from low level to high level. Accordingly, the signal level of the PP-L/G signal output from the flip-flop 798 is switched from a low level representing a groove track to a high level representing a land track.

The waveforms of the signals shown in FIG. 13 appear at the related points in the ID region detecting system including the L/G judging section 301 when the light beam scans the virtual track T2 of the ID region S0 which follows the land track and is followed by the groove track. At this ID region, the track is switched from the land track to the groove track. Therefore, the signal FP switches its level from high level to low level, as already stated.

In this case, in the second polarity judging means 81, as shown in FIG. 13, the signal RP2 goes high in the ID region of the groove track, and then the signal RP1 goes high.

In the comparing means 82, when a synchronizing signal SYNC is generated at the ID region S0 where the land track is switched to the groove track, the signal FP is in low level, the signal RP1 is in high level, and the signal RP2 is in low level, and hence the AND gate 796 produces a low level signal. And the AND gate 797 produces a high level signal.

Under this condition, the set signal S to the flip-flop 798 is in low level, the reset signal R thereto is in high level, and the output signal Q thereof is switched from high level to low level. Therefore, a PP-L/G signal output from the flip-flop 798 is switched from a high level indicating a land track to a low level indicating a groove track.

At the ID regions (S1 to S7, FIG. 1) where the virtual tracks interconnect the groove tracks or the land tracks, the signal levels at the output of the flip-flop 798 follows. At the ID region interconnecting the land tracks, the terminal S of the flip-flop 798 is always at high level and the terminal R thereof is always at low level, and hence the output terminal thereof is always at high level. At the ID region interconnecting groove tracks, the terminal S of the flip-flop 798 is always at low level and the terminal R thereof is always at high level, and hence the output terminal thereof is always at low level. Therefore, at the ID region interconnecting the same kind of tracks, the signal level of the PP-L/G signal is invariable.

The disc player thus constructed is capable of performing a good spindle control of a disc-like recording medium of the DVD-RAM type having no information recorded therein or information recorded in a part thereof in accordance with a signal read out of the disc, and hence of exactly recording information into or playing back the same from the disc.

What is claimed is:

1. A disc player for obtaining a read signal from an optical disc having a plurality of sectors including ID regions preformatted at given angular spatial intervals which demarcate the sectors and are segmented in the track extending direction into first and second regions, said disc player comprising:

an optical read for projecting a light beam onto the optical disc and receiving a light beam reflected from a recording surface of the optical disc;

first and second signal generating devices for generating first and second signals, respectively, which are dependent on record position information recorded in recording regions of the first and the second segmented regions by use of a signal output from said optical read means; and an ID region detecting device for outputting a detecting signal indicating that the ID region is detected when the first and the second signals are both present, said ID region detecting device comprising
- a logical addition signal generating device for generating a logical addition signal based on the logical addition of the first and second signals;
- a logical multiplication signal generating device for generating a logical multiplication signal based on the logical multiplication of the first and second signals;
- a first judging device for judging whether a first count value signal and the logical multiplication signal are both present, wherein the first count value signal is generated based on the logical addition signal; and
- a second judging device for judging whether a second count value signal and the logical addition value are both present, wherein the second count value signal is generated based on an output the first judging device.

2. The disc player according to claim 1, further comprising a track judging device for judging whether to be a land track or a groove track on the basis of the first and second signals and the detecting signal.

3. The disc player according to claim 1, wherein said first signal generating device generates the first signal by use of a signal formed by binarizing an output signal of said optical read device in accordance with a first threshold value, and said second signal generating device generates the second signal by use of a signal formed by binarizing an output signal of said optical read device in accordance with a second threshold value.

4. The disc player according to claim 1, wherein information is recorded in the land tracks and the groove tracks every sector demarcated by the ID regions.

5. The disc player according to claim 1, wherein the optical disc is controlled in rotation thereof in accordance with the detecting signal.

6. The disc player according to claim 4, further comprising a track judging device for judging if the track currently scanned is a land track or a groove track depending on the first signal, the second signal, and the detecting signal.

7. The disc player according to claim 5, further comprising a track judging device for judging if the track currently scanned is a land track or a groove track depending on the first signal, the second signal, and the detecting signal.

* * * * *

UNITED STATES PATENT AND TRADEMARK OFFICE
CERTIFICATE OF CORRECTION

PATENT NO. : 6,282,160 B1　　　　　　　　　　　　　　　　　Page 1 of 3
DATED : August 28, 2001
INVENTOR(S) : Kiyoshi Tateishi and Mitsuru Sato It is certified that error appears in the above-identified patent and that said Letters Patent is hereby corrected as shown below:

<u>Drawings,</u>
Sheet 11, Figure 11, should appear as follows
Sheet 12, Figuer 13, should appear as follows Signed and Sealed this Sixteenth Day of April, 2002

*Attest:*

JAMES E. ROGAN
*Attesting Officer*　　*Director of the United States Patent and Trademark Office*